Patented Feb. 24, 1942

2,273,871

UNITED STATES PATENT OFFICE 2,273,871

DOUBLE SILICATES OF ZIRCONIUM AND METHOD OF MAKING SAME

Charles J. Kinzie, Niagara Falls, N. Y., assignor to The Titanium Alloy Manufacturing Company, New York, N. Y., a corporation of Maine No Drawing. Original application June 12, 1934, Serial No. 730,265. Divided and this application December 24, 1937, Serial No. 181,705

11 Claims. (Cl. 23—110)

This application is a division of my pending application for patent filed June 12, 1934 Serial No. 730,265, now U. S. Letters Patent No. 2,127,844 of August 23, 1938.

My invention relates more particularly to novel double silicates of zirconium and methods of making same. These materials have been found to be of great advantage in the manufacture of enamels and glazes, in which such improved double silicates of zirconium are used as opacifiers, as well as in the manufacture of paints and lacquers in which such novel double silicates of zirconium are employed as pigments.

Zircon ($ZrSiO_4$) has useful properties as a constituent of protective coatings, such as vitreous enamels as well as paint and lacquer coatings made with organic vehicles. I have found, however, that $ZrSiO_4$ is rather difficult to reduce to such a degree of fineness as required for pigment purposes, especially for those applications in which the vehicle and pigment are ground together in an iron mill, in which case any residual gritty abrasive particles in the zircon will be likely to wear off enough iron to discolor the paint or other coating. It is also true that zircon is of a very refractory nature as regards heat and response to chemical action, which tends in ceramics to retard the reactions necessary in order that the zirconium may have its desired effect in combination with other materials employed in forming the ceramic coatings.

I have discovered that by first converting the zircon ($ZrSiO_4$) by heat in a dry way to a double silicate, the compounds formed are free of the objectionable abrasive properties inherent in zircon, and also that the double silicates so formed are less refractory as comparted with the $ZrSiO_4$ and then combine more readily with other ceramic materials to produce the desired effects.

The alkaline earth carbonates, such as $BaCO_3$, $MgCO_3$, $SrCO_3$, have the objectionable feature in ceramics of evolving volumes of $CO_2$ incidental to firing operation in glazes, etc. By combining these compounds with zirconium as alkaline earth zirconium silicates, products are formed which may be added at the mill, and by this means the useful properties of the alkaline earth fluxes are obtained along with the strength imparting, opacifying and color stabilizing effects of zirconium, all combined in one product without the harmful evolution of gases during the firing operation.

These compounds form useful cements as, for example, temperature cements which are less refractory than $ZrSiO_4$ and will upon heating sinter or fuse to bind the bricks, etc. between which the cement is placed; the various combinations of zirconium and silicon with alkaline earths form a temperature cement range from about 700° C. up to about 2000° C. Another feature of this cement phase which has useful applications is that based on the quick setting of the double silicate compounds by reaction with acid, for instance, by wetting with phosphoric or sulphuric acid which upon drying tends to react and set the cement into a hard bonding mass. The novel double silicate of zirconium compounds are relatively free of the gritty properties of zircon, while at the same time they are crystalline in structure so as to form useful polishing agents. Hence the various altered zircons or double silicates of zirconium present a wide range of properties for the polishing field. Certain of the compounds, such as for instance barium zirconium silicates, may also be useful as insecticides and fungicides. The products of my invention are therefore of dual interest in paints and in ceramics and also form useful cements and mild polishing compounds as well as possessing possibilities by way of application along other lines.

In order that the nature of my invention may be understood a series of illustrative examples will be set forth to show how these new products may be obtained by following the various procedures described.

EXAMPLE A.—*Magnesium zirconium silicate* ($MgZrSiO_5$)

BATCH WEIGHTS

| | Per cent |
|---|---|
| 500 parts by weight of $ZrSiO_4$, —325 mesh | 68.49 |
| 230 parts by weight of $MgCO_3$ | 31.51 |
| | 100.00 |

These ingredients are intimately mixed either by wet milling with water to a slip which is then dried, or by means of an initial rough dry mixing, followed by passing the mix through a disintegrating or fine milling machine to bring the particles of $ZrSiO_4$ and $MgCO_3$ into intimate contact.

The charge is preferably formed into bricks by dry or damp press methods in preparation for heating. The bricks are then heated at about 2500° F. to form magnesium zirconium silicate ($MgZrSiO_5$). In order to prepare the double silicates for use, the product is then milled preferably with water to the desired fineness which is readily done since the compound formed is easily reduced to a fine state of sub-division. The milled product is then dried.

Such magnesium zirconium silicate so formed has approximately the following composition:

| | Per cent |
|---|---|
| Magnesium (calculated as MgO) | 18.03 |
| Zirconium (calculated as $ZrO_2$) | 55.11 |
| Silica (calculated as $SiO_2$) | 26.86 |
| | 100.00 |

Crystals of this product have the following optical properties: Uniaxial with distinct basal cleavage and imperfect prismatic cleavage. The index of refraction of these crystals shows $\alpha=1.88+$, $\gamma=1.91$.

Besides the crystals of $MgZrSiO_5$, there are crystals of $ZrO_2$ which are dispersed throughout the mass and included in the crystals of $MgZrSiO_5$. The product is composed of a mixture of these two crystalline materials, the major constituent being $MgZrSiO_5$.

This product may be used as a source of magnesium, zirconium and silicon compounds in enamels and glazes, and is a useful addition at the mill as an opacifier and adjusting agent to vary the expansion of glazes and enamels. It is lower in specific gravity than double zirconium silicates of lead or barium and should also prove useful in paints.

EXAMPLE B.—*Basic magnesium zirconium silicate*

BATCH WEIGHTS

| | Per cent |
|---|---|
| 500 parts by weight of $ZrSiO_4$, —325 mesh | 74.63 |
| 170 parts by weight of $MgCO_3$ | 25.37 |
| | 100.00 |

A charge consisting of the above is prepared as described in Example A. Prepared product is heated at about 2250° F. and milled as described in Example A, and such basic magnesium zirconium silicate has approximately the following composition.

| | Per cent |
|---|---|
| Magnesium (calculated as MgO) | 13.98 |
| Zirconium (calculated as $ZrO_2$) | 57.83 |
| Silica (calculated as $SiO_2$) | 28.18 |
| | 99.99 |

This product consists of about 5% $ZrO_2$, 18-20% zircon; the remaining portion is uniaxial having one index of about $1.88\pm$ and the other about $1.91-$. Very little cleavage shows in this sample, but it appears to be basal and prismatic and otherwise very similar to the crystals in the normal $MgZrSiO_5$.

Although this product still contains some $ZrSiO_4$, it is apparent that the surfaces of these remaining $ZrSiO_4$ particles have been so changed, or else reduced in size, that same no longer constitute a source of grit objectionable in paint making.

EXAMPLE C.—*Barium zirconium silicate* ($BaZrSiO_5$)

BATCH WEIGHTS

| | Parts by weight |
|---|---|
| $ZrSiO_4$, —325 mesh | 500 |
| $BaCO_3$ | 538.4 |

A charge consisting of the above is prepared as described in Example A. Prepared product is heated at about 2350° F. to form barium zirconium silicate ($BaZrSiO_5$). It is milled as described in Example A.

This barium zirconium silicate so formed has approximately the following composition:

| | Per cent |
|---|---|
| Barium (calculated as BaO) | 45.6 |
| Silica (calculated as $SiO_2$) | 17.8 |
| Zirconium (calculated as $ZrO_2$) | 36.6 |
| | 100.0 |

Crystals of this product are isotropic, crystallize in cubic system, but are sometimes elongated to form prisms. Cleavage is indistinct, but tends to be both cubic and octohedral with an index of refraction approximately 1.85.

This product may be a mixture of two crystalline materials bonded by a small amount of glass of R. I. of $1.615\pm$. One crystalline material may be $ZrO_2$ and the other $BaZrSiO_5$, the latter being preponderant in amount and $ZrO_2$ probably less than 10% of total.

Barium is a useful flux in enamels and glazes; in enamels it cannot be added at the mill due to the fact that upon heating and reaction, it yields $CO_2$ gas which would bubble the surface; when added at the batch and smelted $BaCO_3$ tends to froth badly and usually it is none too easy to combine. By use of my barium zirconium silicate the barium may be used at the mill in case of enamels and glazes to obtain the benefits of barium as well as zirconium.

EXAMPLE D.—*Basic barium zirconium silicate*

BATCH WEIGHTS

| | Per cent |
|---|---|
| 500 parts by weight of $ZrSiO_4$, —325 mesh | 75 |
| 166 parts by weight of $BaCO_3$ | 25 |

A charge consisting of the above is prepared as described in Example A. Prepared product is heated to about 2350° F. and milled as described in Example A. Such basic barium zirconium silicate so formed has approximately the following composition:

| | Per cent |
|---|---|
| Barium (calculated as BaO) | 20.61 |
| Zirconium (calculated as $ZrO_2$) | 53.4 |
| Silica (calculated as $SiO_2$) | 26.0 |
| | 100.01 |

This material consists of four materials to wit: crystals of what appears to be barium zirconium silicate, residual zircon, zirconium oxide and some glass-like material.

EXAMPLE E.—*Strontium zirconium silicate* ($SrZrSiO_5$)

BATCH WEIGHTS

| | Per cent |
|---|---|
| 500 parts by weight of $ZrSiO_4$, —325 mesh | 55.49 |
| 401.06 parts by weight of $SrCO_3$ | 44.51 |
| | 100.00 |

A charge consisting of the above is prepared as described in Example A. Prepared product is heated to about 2250° F. and milled as described in Example A.

The strontium zirconium silicate ($SrZrSiO_5$) so formed has approximately the following composition:

| | Per cent |
|---|---|
| Strontium (calculated as SrO) | 36.12 |
| Zirconium (calculated as $ZrO_2$) | 42.95 |
| Silica (calculated as $SiO_2$) | 20.93 |
| | 99.00 |

This normal strontium zirconium silicate is a mixture of a crystal (though possibly more than one kind though not distinguishable as all are very fine) in a glass. The glass has an R. I. of about 1.80±, while the crystal is about 2.1. It has a different shape from $ZrO_2$ as all of these crystals are definitely prisms elongated almost to the extent of being fibers. Probably they are $SrO.ZrO_2$ etc. rather than $ZrO_2$.

EXAMPLE F.—*Basic strontium zirconium silicate*

BATCH WEIGHTS

| | Percent |
|---|---|
| 500 parts by weight of $ZrSiO_4$, —325 mesh | 75 |
| 166 parts by weight of $SrCO_3$ | 25 |

A charge consisting of the above is prepared as described in Example A. Prepared charge is heated to about 2250° F. and milled as described in Example A.

Such basic strontium zirconium silicate so formed has approximately the following composition:

| | Percent |
|---|---|
| Strontium (calculated as SrO) | 18.97 |
| Zirconium (calculated as $ZrO_2$) | 54.48 |
| Silica (calculated as $SiO_2$) | 26.54 |
| | 99.99 |

This basic strontimum zirconium silicate consists of a mixture of glass of index of refraction of about 1.68±, $Sr_2SiO_4$, $ZrO_2$ and a third crystal which may be SrO; it is not possible to tell definitely. The glass phase is the largest, the $ZrO_2$ second, and the $Sr_2SiO_4$ is small. The unknown is only very small portion.

By "basic," I mean a silicate that contains less of MgO-BaO or SrO than is required to form the normal double silicate. When a basic double silicate is made, it will contain some of the normal double silicate, possibly some glass with $ZrO_2$ dispersed either in the glass or in the normal double silicate, or even a third silicate that would form with MgO-BaO or SrO and $SiO_2$, and will contain more free zircon as the percentages of these oxides decrease. In the formation of the basic double silicate, products are made that are more suited for certain uses than the normal double silicates.

In all the foregoing examples the $ZrSiO_4$ has been a pure product containing but small amounts of impurities so that light-colored products may result. However, it would be entirely within the scope of my invention to use a $ZrSiO_4$ containing appreciable amounts of commingled impurities such as monazite, rutile, ilmenite, etc., provided the resultant discoloration will not be objectional for the uses intended.

I could use zirconium ores such as one containing

| | Percent |
|---|---|
| $ZrO_2$, about | 50 |
| $ZrSiO_4$ | 40 |
| Impurities such as free silica, clay, $TiO_2$, $Fe_2O_3$ etc | 10 |

The double silicates and basic silicates may, of course, be made by intimately mixing and dry reacting of the separate oxides, $ZrO_2$, $SiO_2$ with the flux to yield similar products, but this is of only theoretical interest as $ZrSiO_4$ is much the lower priced material.

In the calculated composition of various products no account has been taken of small amounts impurities in the $ZrSiO_4$ or in the various fluxing compounds.

The zircon used was refined zircon containing approximately

| | Percent |
|---|---|
| $ZrO_2$ | 65.00 |
| $SiO_2$ | 34.00 |
| $TiO_2$ | 0.10 |
| $Fe_2O_3$ | 0.10 |
| Others $Al_2O_3$ | 0.80 |
| | 100.00 |

In some instances it may be desirable to wash the milled product with water before drying to remove small amounts water-soluble salts.

My improved products are white to cream-white in color.

Mention has been made of pressing the mixture into bricks prior to heating. This allows of stacking charge in a kiln leaving space between bricks to permit heat to penetrate. Reactions have been made by heating loose material in crucibles and on open hearths with stirring, the reactions appear to proceed more rapidly when charge is compacted. The charge could be extruded damp into rods of suitable size and heated or can be shaped otherwise. The charges are dry-reacted and not fused.

I have found that the compounds of the metals which will effectively react with the zirconium silicate are the bi-valent oxides and carbonates of magnesium, barium and strontium. The amounts of these compounds of the metals used as reagents in the charge vary from that required to combine theoretically with the zircon to form the normal double silicate of zirconium with the metal used, down to amounts as shown in the "basic" examples to form a complex consisting of the normal silicate, zirconium oxide and some residual zircon together with other substances that can not be identified with certainty. The resulting product as a basic double silicate consists of a mixture or complex and is not a definite chemical compound. The temperatures employed in these examples is sufficiently high to secure a substantially complete reaction of the ingredients of the charge in which the zircon is decomposed, but without fusion of such ingredients, and the products are in the form of finely-divided pigment particles.

I claim as my invention:

1. The method of making a double silicate of zirconium which consists in heating an intimately mixed charge composed of finely-milled zirconium silicate and a carbonate of a metal selected from the group consisting of magnesium, barium and strontium in an amount less than that required to theoretically combine with the zirconium silicate to form the normal double silicate at a temperature sufficient to secure a reaction of the ingredients of the charge in the solid phase but without fusion thereof to form a complex consisting of the basic double silicate of zirconium with said selected metal, zirconium oxide and residual zirconium silicate.

2. The method of making a double silicate of zirconium which consists in heating an intimately mixed charge composed of finely-milled zirconium silicate and a carbonate of a metal selected from the group consisting of magnesium, barium and strontium in an amount less than that required to theoretically combine with the zirconium silicate to form the normal double silicate between 2250° and 2500° F. to secure a reaction of the ingredients of the charge in the solid phase but without fusion thereof to form a complex consisting of the basic double silicate of zirconium with said selected metal, zirconium oxide and residual zirconium silicate.

3. The method which comprises heating an intimate mixture of finely-milled zirconium silicate and not more than approximately one mol of a carbonate of a metal selected from the group consisting of magnesium, barium and strontium, per mol of zirconium silicate at temperatures below fusion of the ingredients of the mixture but sufficiently high to secure a substantially complete reaction and decomposition in the solid phase of the zirconium silicate and said carbonate to form a double silicate of zirconium and said selected metal.

4. The method which comprises heating an intimate mixture of a major proportion of finely-milled zirconium silicate and not more than approximately one mol of magnesium carbonate, per mol of zirconium silicate, at temperatures below fusion of the ingredients of the mixture but sufficiently high to secure a substantially complete reaction and decomposition in the solid phase of the zirconium silicate and magnesium carbonate to form a double silicate of zirconium and magnesium.

5. The method which comprises heating an intimate mixture of a major proportion of finely-milled zirconium silicate and not more than approximately one mol of magnesium carbonate, per mol of zirconium silicate, at about 2500° F. to secure a substantially complete reaction and decomposition in the solid phase of the zirconium silicate and magnesium carbonate to form a double silicate of zirconium and magnesium.

6. The method which comprises heating an intimate mixture of a major proportion of finely-milled zirconium silicate and not more than approximately one mol of barium carbonate, per mol of zirconium silicate, at temperatures below fusion of the ingredients of the mixture but sufficiently high to secure a substantially complete reaction and decomposition in the solid phase of the zirconium silicate and barium carbonate to form a double silicate of zirconium and barium.

7. The method which comprises heating an intimate mixture of a major proportion of finely-milled zirconium silicate and not more than approximately one mol of barium carbonate, per mol of zirconium silicate, at about 2350° F. to secure a substantially complete reaction and decomposition in the solid phase of the zirconium silicate and barium carbonate to form a double silicate of zirconium and barium.

8. The method which comprises heating an intimate mixture of a major proportion of finely-milled zirconium silicate and not more than approximately one mol of strontium carbonate, per mol of zirconium silicate, at temperatures below fusion of the ingredients of the mixture but sufficiently high to secure a substantially complete reaction and decomposition in the solid phase of the zirconium silicate and strontium carbonate to form a double silicate of zirconium and strontium.

9. The method which comprises heating an intimate mixture of a major proportion of finely-milled zirconium silicate and not more than approximately one mol of strontium carbonate, per mol of zirconium silicate, at about 2250° F. to secure a substantially complete reaction and decomposition in the solid phase of the zirconium silicate and strontium carbonate to form a double silicate of zirconium and strontium.

10. A composition comprising a major proportion of a double silicate of zirconium and a metal selected from the group consisting of magnesium, barium and strontium and a minor proportion of zirconium oxide and a silicate of said selected metal, said composition containing at least one mol of combined and uncombined zirconium oxide per mol of combined and uncombined metal oxide of said group.

11. A composition comprising a major proportion of a double silicate of zirconium and a metal selected from the group consisting of magnesium, barium and strontium and a minor proportion of zirconium oxide and a silicate of said selected metal, said composition being obtained by the thermic reaction and decomposition of zirconium silicate and a carbonate of said selected metal in the solid phase and without fusion, said composition containing at least one mol of combined and uncombined zirconium oxide per mol of combined and uncombined metal oxide of said group.

CHARLES J. KINZIE.